United States Patent [19]
Pallos

[11] 3,928,622
[45] Dec. 23, 1975

[54] CERTAIN NON-TERPENOID JUVENILE HORMONE MIMICKING COMPOUNDS AND THEIR USE IN CONTROLLING INSECTS
[75] Inventor: Ferenc Marcus Pallos, Walnut Creek, Calif.
[73] Assignee: Stauffer Chemical Company, Westport, Conn.
[22] Filed: July 31, 1974
[21] Appl. No.: 493,289

Related U.S. Application Data
[62] Division of Ser. No. 437,128, Jan. 28, 1974, Pat. No. 3,847,970.

[52] U.S. Cl. .......................... 424/320; 424/DIG. 12
[51] Int. Cl.² ............................................. A01N 9/20
[58] Field of Search ...................... 424/320, DIG. 12

[56] References Cited
UNITED STATES PATENTS
3,436,463  4/1969  Mayhew et al. .................... 424/320
3,758,516  9/1973  Siddall et al. ...................... 424/320

Primary Examiner—V. D. Turner
Attorney, Agent, or Firm—Edwin H. Baker

[57] ABSTRACT

Compounds having the formula

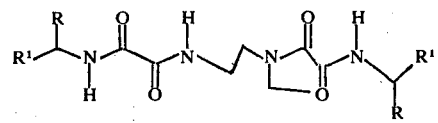

in which R and R¹ are alkyl and their use in controlling insects.

3 Claims, No Drawings

CERTAIN NON-TERPENOID JUVENILE HORMONE MIMICKING COMPOUNDS AND THEIR USE IN CONTROLLING INSECTS

This is a division of application Ser. No. 437,128, filed Jan. 28, 1974, now U.S. Pat. No. 3,847,970.

This invention relates to the use of certain novel chemical compounds effective in combatting noxious insects.

A new class of selective compounds has been found which exerts a disrupting influence upon the normal development of insects. Such compounds impede the metamorphosis of larvae to pupae and pupae to adults resulting in the formation of abnormal members of the treated species which may also be non-viable or sterile. This ultimately leads, indirectly at least, to the destruction of a pest population.

The compounds of the present invention are believed to have the further advantages that they are non-toxic to warm blooded animals and are highly effective in controlling insects at low dosages.

One embodiment of the present invention is concerned with novel pesticidal compositions.

In another embodiment, the invention is concerned with the active pesticidal component of such compositions.

In still another embodiment, the invention is concerned with a process for controlling insects by hindering or impeding the metamorphosis and reproduction of the insects.

The compounds of the present invention that are useful in controlling insects are those having the formula

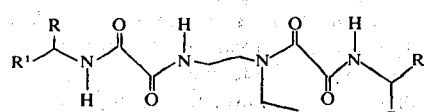

in which R is alkyl having 1 to 4 carbon atoms, preferably methyl or ethyl and $R^1$ is alkyl having 1 to 4 carbon atoms, preferably methyl or ethyl with the proviso that R and $R^1$ taken together have no more than 6 carbon atoms.

As indicated heretofore, the above compounds are useful in impeding the metamorphosis and/or the reproduction of insects. The activity of the compounds is such that insects at any stage of their development can be effectively treated therewith.

The compounds of this invention can be prepared by the following reactions:

Reaction 1)

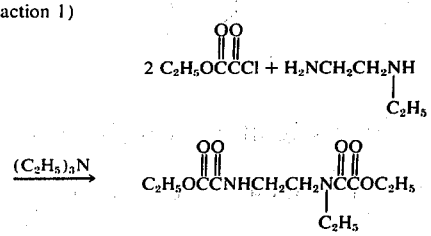

Reaction 2)

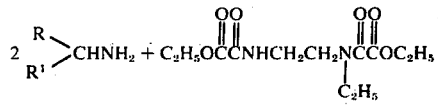

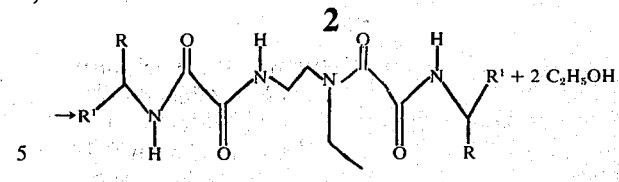

Preferably reaction No. 1 is carried out in a solvent such as methylene chloride, with stirring by slowly adding a solution of the alkyl oxalyl chloride in a solvent such as methylene chloride to a solution of the diamine in the presence of an acid acceptor, such as triethylamine, at a temperature around 0°C., followed by stirring to complete the exothermic reaction. The reaction product is recovered by conventional techniques such as washing with water, followed by separating the organic layer, washing again and drying with anhydrous $MgSO_4$. Finally, the solvent is filtered and removed by vacuum stripping.

Preferably, the reaction is carried out using one mole amounts of the diamine reactant, and two moles of the oxalyl chloride reagent. Although, a slight excess of a reactant can be used.

Preferably, reaction No. 2 is carried out by reacting the product of reaction No. 1, the bis-ethyloxalyl compound, with the desired amine. The excess amine acts as a solvent. An exothermic reaction occurs upon mixing. When the reaction subsides, the desired compound is obtained by stripping the volatile components.

Preparation of the compounds of this invention is illustrated by the following specific examples.

EXAMPLE I

N-ethyl-N,N'-bis(ethyloxalyl)-ethylene diamine

8.8 grams (0.1 mole) N-ethyl-ethylene diamine, 10.1 grams (0.1 mole) triethylamine and 150 milliliters $CH_2Cl_2$ are mixed in a 3-neck flask equipped with a dropping funnel, a mechanical stirrer and placed in an ice bath. 27.2 grams (0.2 mole) ethyl oxalyl chloride dissolved in 50 milliliters $CH_2Cl_2$ is slowly dropped into the mixture under stirring causing an exothermic reaction. The reaction mixture is stirred for two hours.

The reaction product is recovered by adding 200 milliliters water with stirring. The separated organic layer is washed again with 200 ml. water, followed by drying with $MgSO_4$. The organic phase is filtered and stripped to yield 17.3 grams of the desired product. $N_D^{30}$ 1.4670. n.m.r. analysis confirm the structure.

EXAMPLE II

N-ethyl-N,N'-bis(isopropyloxamyl)-ethylene diamine

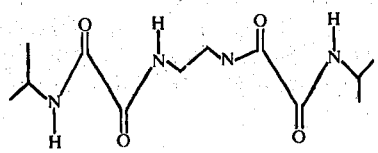

3.0 grams of the product obtained in Example I are mixed with 15 milliliters isopropylamine. After an exothermic reaction subsides, the resulting mixture is refluxed for ½ hour, cooled and stripped in vacuum. 3.4 grams of the desired compound is obtained. n.m.r. analysis confirms the structure.

EXAMPLE III

N-ethyl-N,N'-bis(sec-butyloxamyl)-ethylene diamine

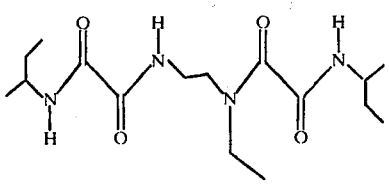

2.5 grams of the product obtained in Example I are mixed with 15 milliliters sec-butylamine. After an exothermic reaction subsides, the resulting mixture is refluxed for ¼ hour, cooled and stripped in vacuum. 2.8 grams of the desired product is obtained. m.p. 92°–105°C. n.m.r. analysis confirms the structure.

The product of reaction No. 1 is a novel compound useful for preparing the compounds of this invention. Other esters are also useful for the same purpose and have the formula:

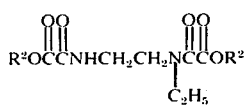

wherein $R^2$ is alkyl having 1 to 6 carbons, cyclohexyl or phenyl. They are prepared by using the appropriately substituted oxalyl chloride in place of ethyl oxalyl chloride in reaction No. 1.

Insecticidal Evaluation Test

The degree of activity of a candidate compound to hinder or impede the metamorphosis of insects is measured by treating the penultimate larval stage of a representative insect with the compound and examining it after its last molt toward the adult form for retention of immature features.

Specifically, yellow mealworm, *Tenebrio molitor*, L., larvae are maintained at 28°C. and 40 percent humidity on a diet of bran flakes. Prepupae are collected from the culture and kept in separate containers. The pupae collected once daily, are 1–25 hours old at the time of treatment. By means of a syringe, suitable amounts of candidate compounds in 0.5 or 1.0 μl of acetone are applied to the venter of *Tenebrio molitor*, L. pupae. Treated pupae are maintained at 28°C. and 40 percent humidity until the adults emerged (usually within 6–8 days). Emerged adults are graded as positive, negative, or dead. To be considered a positive response, the presence of typical pupal cuticle, urogomphi, gin trap, and abnormal wings, etc., are required. For each test, 1 group of 10 pupae was used.

The dose of a candidate compound per pupa that is needed to give a positive response in the above insecticidal evaluation test for 5 of the 10 pupae is determined. Table II shows these doses under the column $ED_{50}$, the "ED" being an abbreviation for effective dose, for the compounds prepared in Examples II and III.

TABLE II

| COMPOUND OF | $ED_{50}$ μg/pupa |
|---|---|
| Example II | .01 |
| Example III | .005 |

The compounds of this invention are generally embodied into a form suitable for convenient application. For example, the compounds can be embodied into pesticidal composition which are provided in the form of emulsions, suspensions, solutions, dusts, and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc., water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc., upon which the pests feed. When applied in such a manner, it will be advantageous to use a compound which is not volatile.

The compounds can also be combined with baits in a conventional manner.

The precise manner in which the pesticide compositions of this invention are used in any particular instance will be readily apparent to a person skilled in the art. Generally, the active pesticide compound will be embodied in the form of a liquid composition, for example, an emulsion, suspension, or aerosol spray. While the concentration of the active pesticide in the present compositions can vary within rather wide limits, ordinarily the pesticide compound will comprise not more than about 50 percent by weight of the composition. Preferably, however, the pesticide compositions of this invention will be in the form of solutions or suspensions containing about 0.1 to 1.0 percent by weight of the active pesticide compound.

What is claimed is:

1. A method of impeding the metamorphosis of Tenebrio molitor comprising applying thereto at any stage of its development an effective amount of a compound of the formula

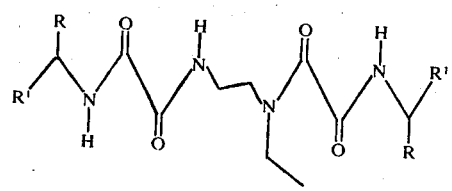

in which R is alkyl having 1 to 2 carbon atoms and $R^1$ is methyl.

2. The method of claim 1 in which R is methyl and $R^1$ is methyl.

3. The method of claim 1 in which R is ethyl and $R^1$ is methyl.

* * * * *